United States Patent
Yamaguchi (10) Patent No.: US 7,660,435 B2
(45) Date of Patent: Feb. 9, 2010

(54) DAMAGE ANALYSIS-SUPPORTING SYSTEM

(76) Inventor: Akihiko Yamaguchi, c/o Tsubasa System Co., Ltd., 25-14, Kameido 2-Chome, Koutou-Ku, Tokyo (JP) 136-0071

( * ) Notice: Subject to any disclaimer, the term of this patent is extended or adjusted under 35 U.S.C. 154(b) by 944 days.

(21) Appl. No.: 10/561,145

(22) PCT Filed: Jun. 21, 2004

(86) PCT No.: PCT/JP2004/008723

§ 371 (c)(1),
(2), (4) Date: Dec. 19, 2005

(87) PCT Pub. No.: WO2004/113137

PCT Pub. Date: Dec. 29, 2004

(65) Prior Publication Data

US 2007/0052973 A1    Mar. 8, 2007

(30) Foreign Application Priority Data

Jun. 19, 2003    (JP) ............................. 2003-175094

(51) Int. Cl.
*G06K 9/00* (2006.01)
(52) U.S. Cl. .................. 382/104; 382/284; 345/629
(58) Field of Classification Search .................. 382/100, 382/104, 284, 291, 294; 705/4; 345/419, 345/629, 630, 634
See application file for complete search history.

(56) References Cited

U.S. PATENT DOCUMENTS 6,185,540 B1    2/2001    Schreitmueller et al. ....... 705/4

2003/0200123 A1*   10/2003   Burge et al. ..................... 705/4
2008/0183535 A1*   7/2008    Kahana .......................... 705/7

FOREIGN PATENT DOCUMENTS

| CA | 2 446 519 A1 | 11/2002 |
| EP | 0 644 501 A1 | 3/1995 |
| GB | 2 381 621 A | 5/2003 |
| JP | 09-309416 A | 12/1997 |
| JP | 10-170304 A | 6/1998 |
| JP | 2002-123630 A | 4/2002 |
| JP | 2002-329100 A | 11/2002 |
| JP | 2003-058653 A | 2/2003 |

* cited by examiner

*Primary Examiner*—Andrew W Johns
(74) *Attorney, Agent, or Firm*—Burr & Brown (57) ABSTRACT

A technique for analyzing damage to a motor vehicle, capable of accurately specifying damage on each component by a simple operation. A damage analysis-supporting system for supporting analysis of damage on a motor vehicle has an image generating-portion (301) and a damage-analyzing portion (303). The image-generating portion (301) imports individual drawing data corresponding to components constituting the vehicle into layers and generates an image of a vehicle body seen from a particular direction by superposing the layers. The damage-analyzing portion (303) receives input by a user to the image, where the input designates the area of damage. At the same time, the damage-analyzing portion (303) specifies a damaged portion of each component on a layer-by-layer basis, where each layer has drawing data that belong to the area of damage designated by the user.

9 Claims, 7 Drawing Sheets

DAMAGE ANALYSIS-SUPPORTING SYSTEM

TECHNICAL FIELD

The present invention relates to a technique for analyzing damage to a motor vehicle, and more suitably to a damage-analyzing technique for supporting sheet metal repair cost-estimating work or the like.

BACKGROUND ART

As a technique for analyzing damage to a motor vehicle, there is a system for estimating a cost to repair a vehicle disclosed in JP 2002-259597 A already filed by the applicant of the present invention, for instance.

With the motor vehicle repair cost-estimating system, images of components assembled into a damaged site designated by a user are list-displayed on a display apparatus and a selection of components necessary for repair of the damaged site from the component list is received. Also, repair work wages corresponding to the selected components and prices of the components necessary for the repair are read from a storage apparatus and a repair cost is calculated from a total of them.

That is, in the conventional motor vehicle repair cost-estimating system, the list of the components belonging to the damaged site designated by the user is displayed on the display apparatus, the components necessary for the repair are selected by the user himself/herself from a group of the list-displayed components, and a cost necessary for replacement and repair of the components selected by the user is outputted as an estimate.

By the way, in the conventional motor vehicle repair cost-estimating system, a group of the components positioned at the damaged site designated by the user is list-displayed on the display apparatus and damaged components are finally determined through a selection of each damaged component in the component list. That is, final specification of the damaged components is left to user's judgment to the end. Also, the component selection is made through a component list screen that is different from a damaged site designation screen. Therefore, in order to specify the damaged components, the user needs to adequately understand a damage situation and a damaged motor vehicle.

DISCLOSURE OF THE INVENTION

The present invention has been made in the light of the technical background described above and has an object to provide a damage analyzing-technique, with which it becomes possible to accurately specify damage on each component by a simple operation.

The present invention provides a damage analysis-supporting system for supporting analysis of damage on a motor vehicle, characterized by including: an image-generating apparatus that imports individual drawing data corresponding to components constituting the motor vehicle into layers and generates an image of an analysis target site by superposing the layers; an area designation-receiving apparatus that receives input designating a damaged area by a user to the image; and a damage-analyzing apparatus that specifies a damaged portion of each component on a layer-by-layer basis, with each layer having drawing data that belongs to the damaged area designated by the user.

With the damage analysis-supporting system according to the present invention constructed in the manner described above, the image-generating apparatus imports the individual drawing data corresponding to the components into the layers and generates an image of an analysis target site by superposing the layers. It should be noted that the layers correspond to image process regions for achieving a hierarchical display function of an image process technique. Also, the area designation-receiving apparatus receives the input designating the damaged area by the user to the image and recognizes the damaged area. Further, the damage-analyzing apparatus specifies a damaged portion of each component on a layer-by-layer basis, with each layer having drawing data that belongs to the designated damaged area.

That is, the damage analysis-supporting system according to the present invention receives the designation of the damaged area to the image composed of the multiple layers having the drawing data corresponding to the components, so the designation of the damaged area is reflected in every layer contained in the damaged area (region). As a result, component damage analysis on a layer-by-layer basis becomes possible and, as to the presence/absence of damage, it becomes possible for the user to designate the damaged area for each component by one operation without separately designating the damaged area for each component.

Further, the damage-analyzing apparatus may have a construction that coordinate points of the damaged area are calculated with reference to coordinates of the image, and the calculated coordinate points are compared with coordinate points of the drawing data given to the layers to specify each portion, in which the coordinate points agree with each other, as the damaged portion.

With the construction, the coordinate points of the damaged area are calculated with reference to the coordinates of the image having consistency with the coordinates of the layers. As a result, it becomes possible to specify the presence or absence of damage at each coordinate point of the drawing data through comparison of the calculated coordinate points and the coordinate points of the drawing data given to the layers. That is, with the construction, the damaged area is recognized with reference to the coordinates of the image having the consistency with the coordinates of the layers, so precise comparison therebetween becomes possible without using any complicated computation process.

Further, the damage-analyzing apparatus may have a construction including a damage degree-calculating apparatus that, based on ratios of a number of pixels of the damaged portion to numbers of pixels of the drawing data, calculates damage degrees of the components corresponding to the drawing data.

With the construction, a damage condition of the component is converted into a damage degree, such as a ratio, which is specifiable with a numeric value. That is, it becomes possible to quantitatively grasp the damage condition of the component.

Also, the damage analysis-supporting system may have a construction such that, on condition that any of the damage degrees calculated by the damage degree-calculating apparatus exceed a damage degree at which component replacement should be made, the damage-analyzing apparatus specifies a whole of each corresponding component as the damaged portion.

With the construction, on condition that the calculated damage degree reaches the damage degree at which component replacement should be made, the whole of the component is specified as the damaged portion. That is, with the construction, in addition to local damage analysis, damage analysis, whose target is the whole of the component, also becomes possible.

Furthermore, the present invention may have a construction such that a plurality of templates are prepared which are used to designate the damaged area, in which in response to an operation in which the user selects one of the templates and attaches the selected template to the image, the area designation-receiving apparatus detects an attachment position of the template as the damaged area.

With the construction, in the designation of the damaged area, in response to an operation in which the user has selected one of the templates and attaches the selected template to the image, the attachment position of the template is recognized as the damaged area. That is, by reflecting simple work, such as the template selection and attachment, in the designation of the damaged area, simplification of the operation is achieved.

Further, the present invention provides the following damage analysis program. That is, provided is a damage analysis program for causing a computer to support analysis of damage on a motor vehicle, characterized in that the computer is caused to realize: an image-generating function of importing individual drawing data corresponding to components constituting the motor vehicle into layers and generating an image of an analysis target site by superposing the layers; an area designation-receiving function of receiving input designating a damaged area by a user to the image; and a damage-analyzing function of specifying a damaged portion of each component on a layer-by-layer basis, with each layer having drawing data that belongs to the damaged area designated by the user.

In addition, the damage analysis program may have a construction including: a function of calculating coordinate points of the damaged area with reference to coordinates of the image; and a function of comparing the calculated coordinate points with coordinate points of the drawing data given to the layers to specify each portion, in which the coordinate points agree with each other, as the damaged portion.

It should be noted that in addition to distribution of the program through a recording medium such as a ROM (Read Only Memory), an HD (Hard Disk), an MO (Magnet Optical), or a CD-ROM (Compact Disc Read Only Memory), distribution thereof through a communication medium, such as the Internet, is also possible. By introducing the damage-analyzing program into a computer through the recording medium or the communication medium, it becomes possible to cause the computer to function as the damage analysis-supporting system.

Further, according to the present invention, there is provided the following damage analysis-supporting method. That is, provided is a damage analysis-supporting method for causing a computer to support analysis of damage on a motor vehicle, characterized in that the computer imports individual drawing data corresponding to components constituting the motor vehicle into layers, generates an image of an analysis target site by superposing the layers, receives input designating a damaged area by a user to the image, and specifies a damaged portion of each component on a layer-by-layer basis, with each layer having drawing data that belongs to the damaged area designated by the user.

Still further, at the time of the specification of the damaged portion, coordinate points of the damaged area may be calculated with reference to coordinates of the image, and the calculated coordinate points may be compared with coordinate points of the drawing data given to the layers to specify each portion, in which the coordinate points agree with each other, as the damaged portion.

It should be noted that it is possible to combine the constructions according to the present invention with each other so long as the combination does not depart from the technical idea of the present invention.

As described above, according to the present invention, it becomes possible to provide a damage analysis-supporting system, supporting program, and supporting method, with which it becomes possible to accurately specify damage on each component by a simple operation.

BEST MODE FOR CARRYING OUT THE INVENTION

Hereinafter, a preferred embodiment of the damage analysis-supporting system according to the present invention will be described.

<System Outline>

Figure 1:
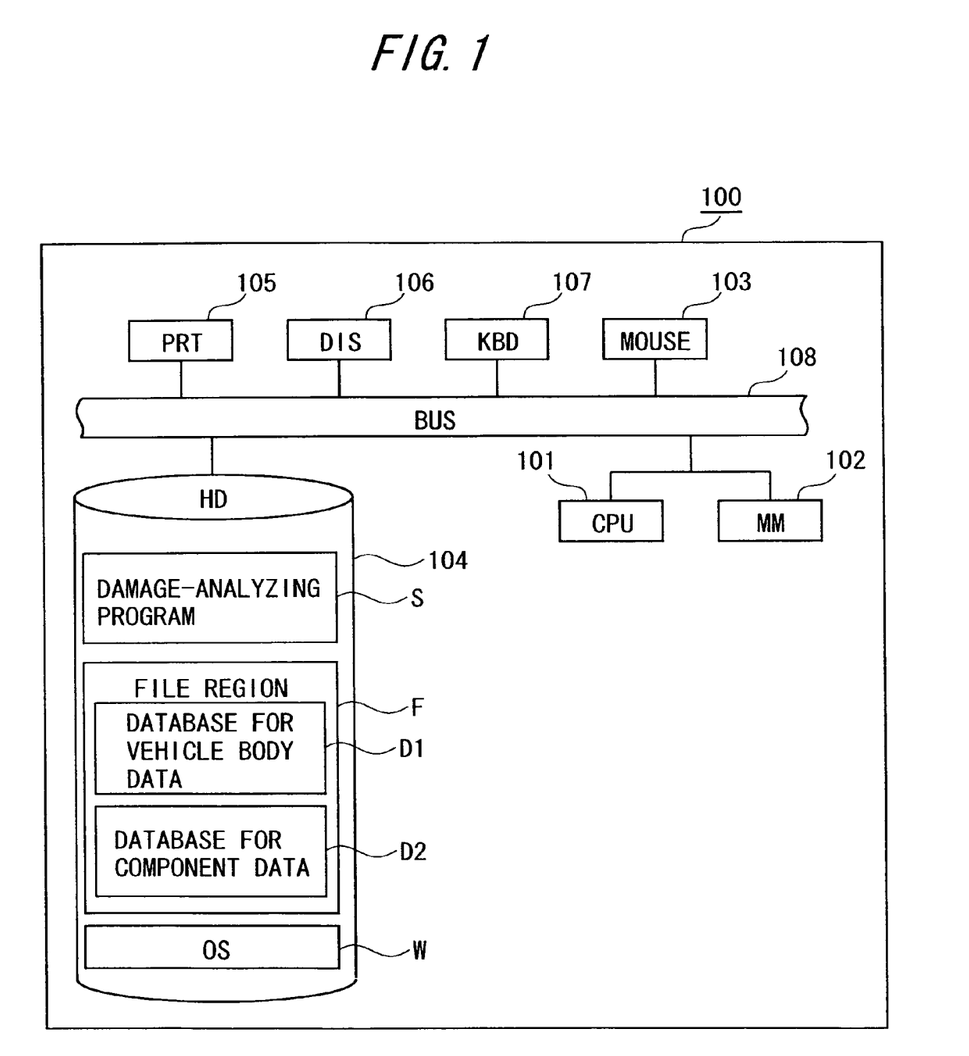
[FIG. 1] A system construction diagram of a damage analysis-supporting system according to an embodiment of the present invention.

As shown in FIG. 1, a damage analysis-supporting system 100 of this embodiment includes a CPU (Central Processing Unit) 101, a main memory 102 composed of a ROM (Read Only Memory), a RAM (Random Access Memory), and the like connected to the CPU 101, and an HD (Hard Disk) 104 connected to the CPU 101 and the main memory 102 through a bidirectional bus 108.

Also, the damage analysis-supporting system 100 includes various external devices such as input devices like a keyboard 107 and a mouse 103, a display 106 for displaying an image used in damage analysis, and a printer 105 for printing a result of the analysis and the like.

Further, an operating system (OS) W and a damage-analyzing program S according to the present invention are stored in the HD 104 and the CPU 101 carries out damage analysis by executing the damage-analyzing program S under a state in which the operation system W is running.

Still further, a file region F is reserved in the HD 104 and a database D1 for vehicle body data storing vehicle body data F1 used in damage analysis and a database D2 for component data storing component data F2 are constructed in the file region F.

In the database D1 for vehicle body data, multiple pieces of vehicle body data F1 are stored to be associated with car type attributes such as manufacturer names, car type names, models, model designation numbers, and categorization classification numbers. Also, it is possible to extract the vehicle body data F1 corresponding to a desired car type through designation of the car type attributes.

Also, to each piece of vehicle body data F1, in addition to default bitmap data showing the appearance of a vehicle body from a suitable display direction, component data acquisition information for determining component data that should be referred to at the time of subsequent damage analysis is given.

It should be noted that the component data acquisition information corresponds to a sketch drawing of the vehicle body displayed on the display 106 at the time of the damage analysis and is provided for each display direction. Site data F2 that should be referred to at the time of the damage analysis is determined with reference to the component data acquisition information.

The component data F2 stored in the database D2 for component data is stored to be associated with the car type attributes and the vehicle body display directions. Also, to each piece of component data F2, drawing data I of a component (door panel, for instance) corresponding to the component data F2 is given in a bitmap data format.

It should be noted that multiple pieces of component data F2 are provided for each component and are respectively given drawing data I whose display directions of the component are different from each other. That is, a certain piece of component data F2 of a certain component is given drawing data, in which the component is seen from the front of a vehicle body, and another piece of component data F2 of the component is given drawing data in which the component is seen from the left side of the vehicle body. In the manner described above, multiple pieces of component data F2 are provided for each component.

Figure 2:
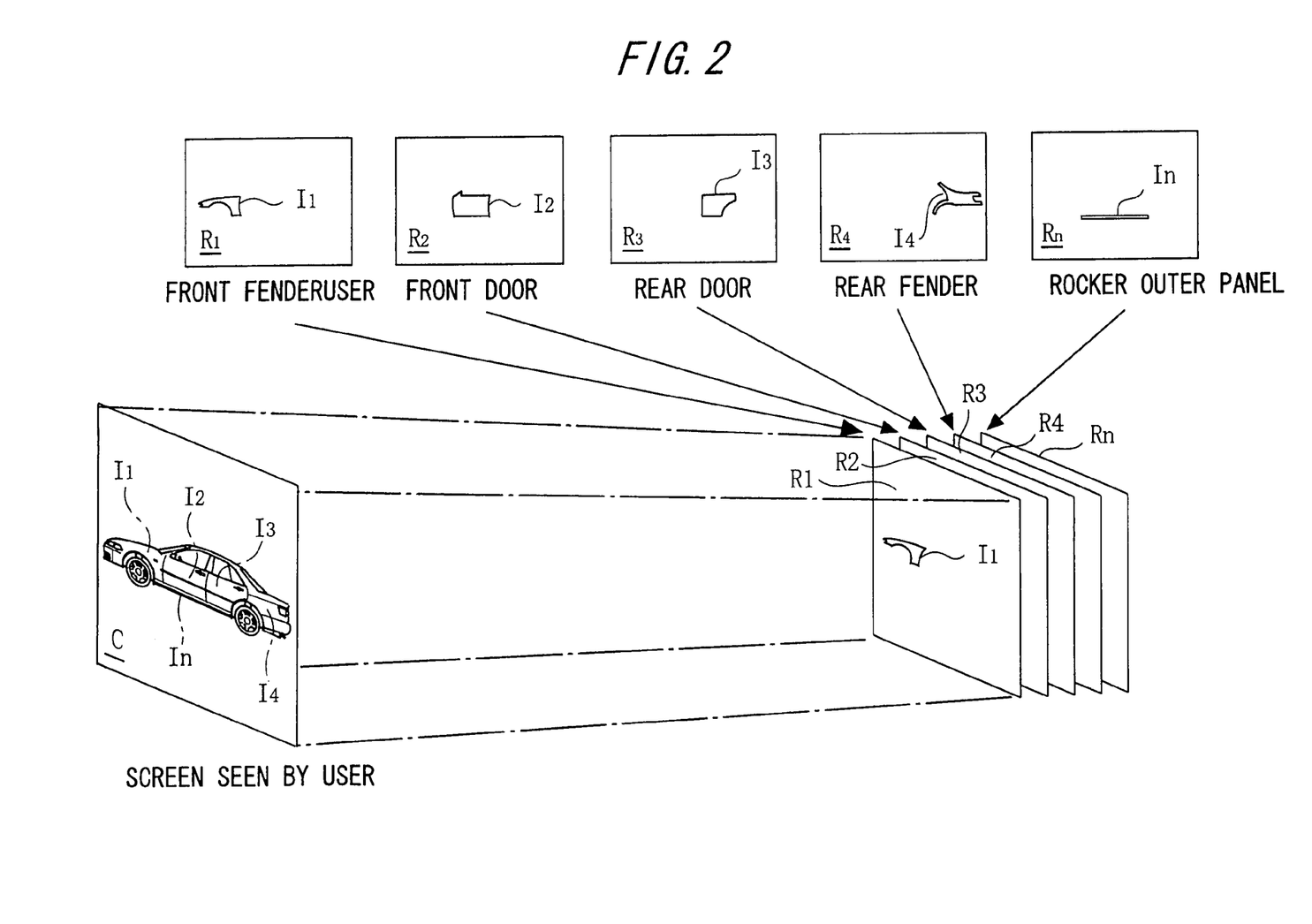
[FIG. 2] An explanatory diagram for explanation of an image creation method according to the embodiment.

Also, consistency in display size of the drawing data I and display position (layout) on the display 106 among the component data F2 is secured and by importing individual drawing data $I_1$ to $I_n$ into layers $R_1$ to $R_n$, and superposing the layers $R_1$ to $R_n$ with a general image process technique as shown in FIG. 2, an image C, in which the vehicle body is seen from a particular direction, is generated.

<Damage-Analyzing Program>

Next, the damage-analyzing program S will be described with reference to FIGS. 3 to 7.

Figure 3:
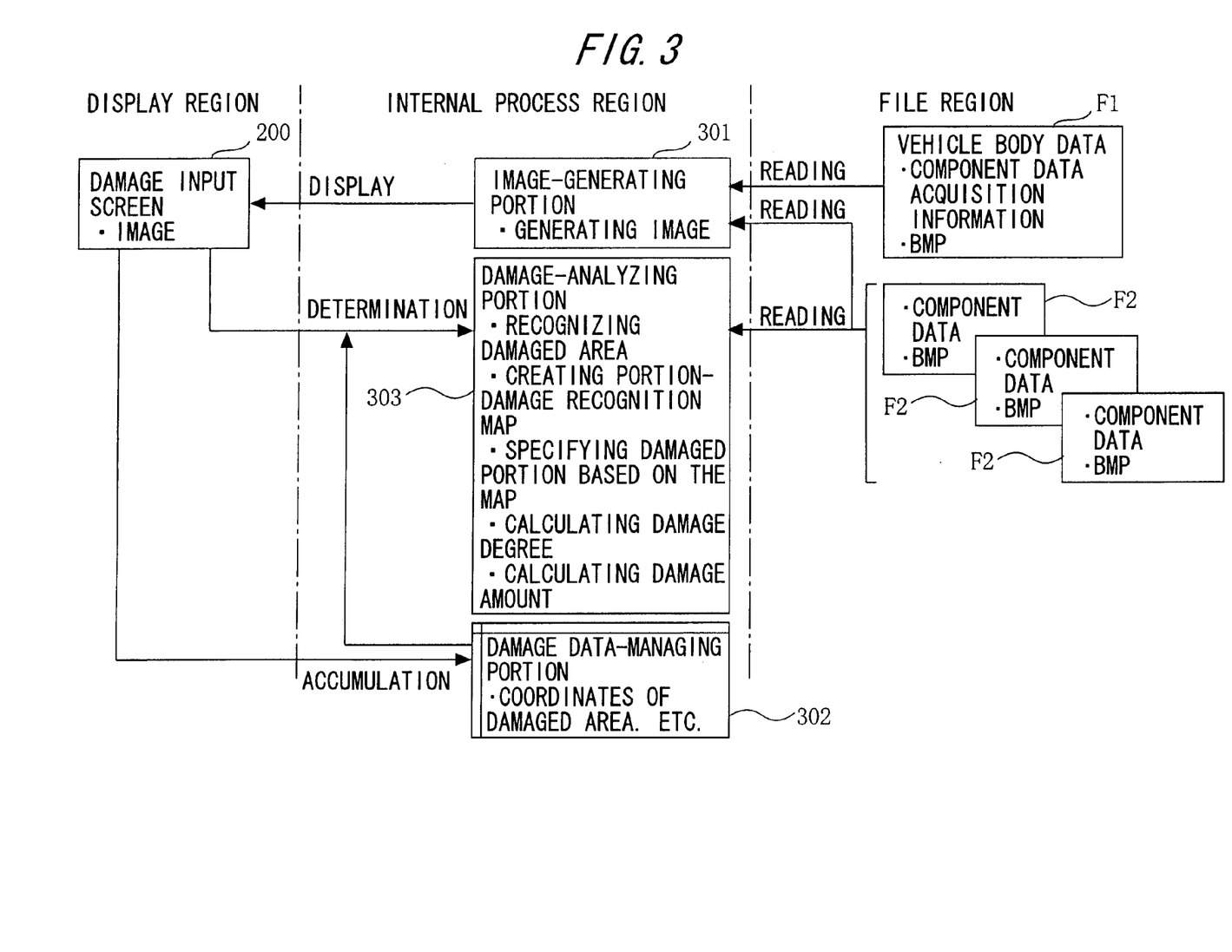
[FIG. 3] A schematic construction diagram showing a control system of the damage analysis-supporting system according to the embodiment.

It should be noted that FIG. 3 is a system construction diagram of a control system used to control the damage analysis-supporting system.

Figure 4:
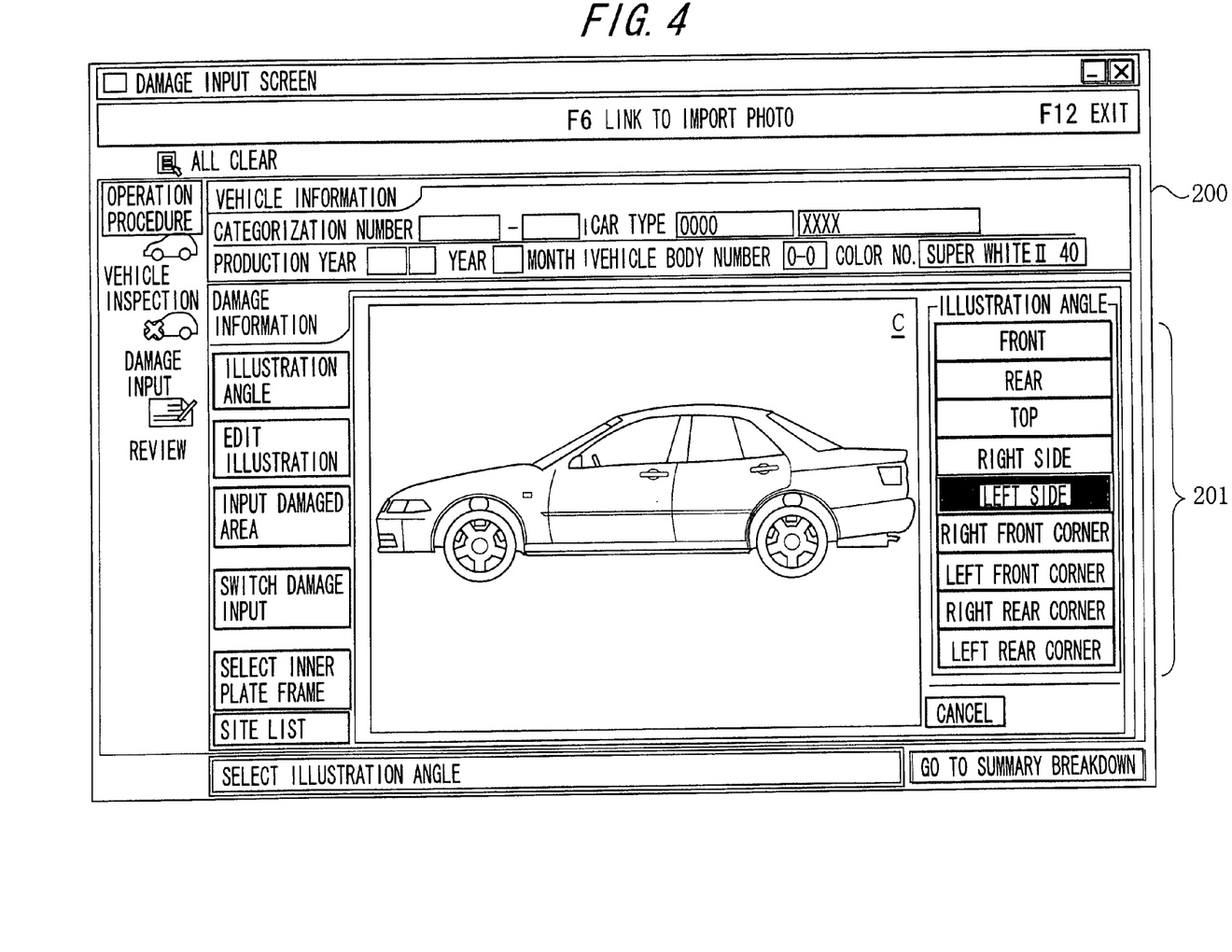
[FIG. 4] A schematic construction diagram of a damage input screen according to the embodiment.
Figure 5:
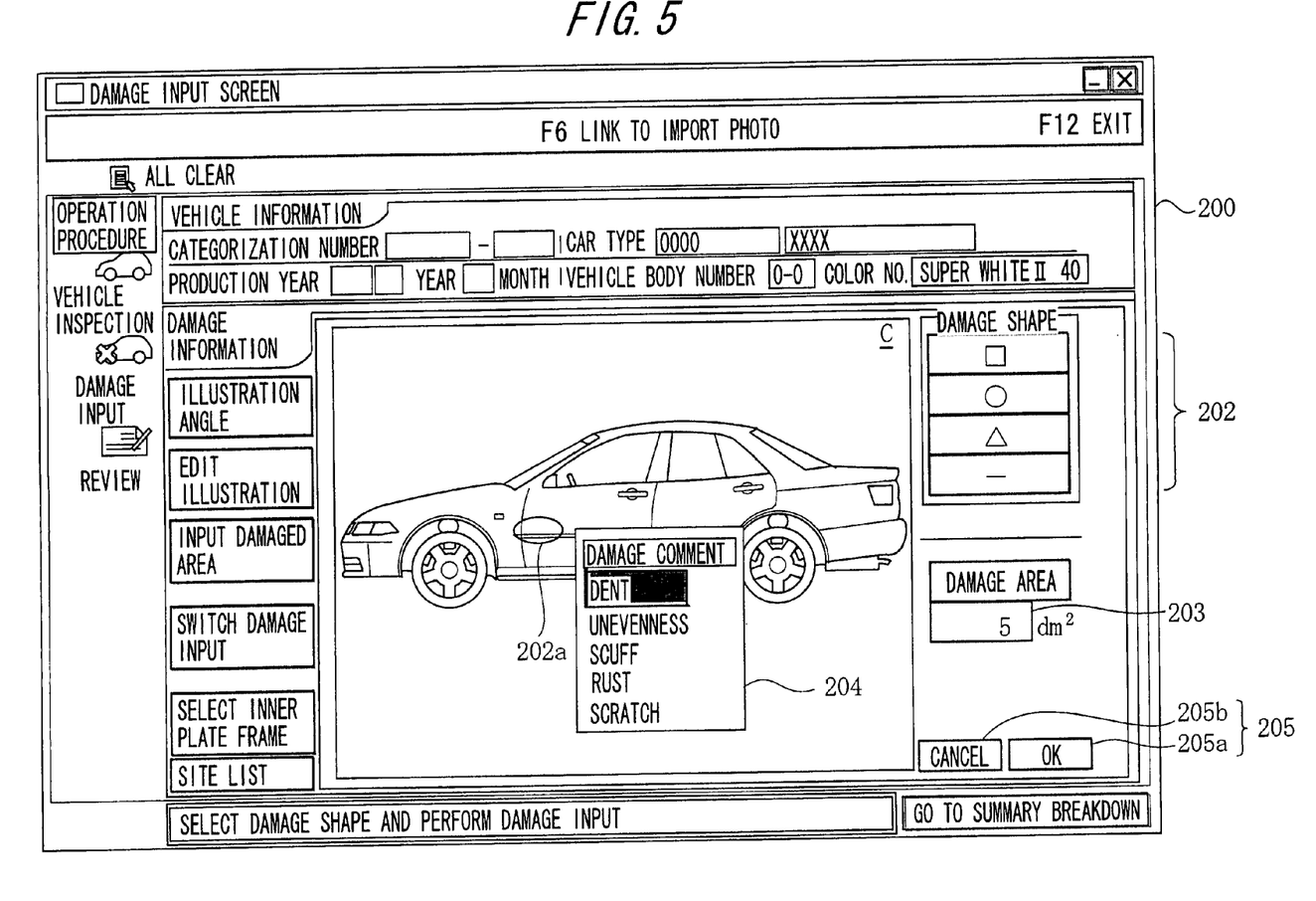
[FIG. 5] An explanatory diagram for explanation of a user's area designating-operation through the damage input screen.

Also, FIGS. 4 and 5 are each a schematic construction diagram of a damage input screen 200 that is displayed on the display 106 as appropriate at the time of execution of the damage-analyzing program S. Here, it is possible to operate the damage-analyzing program S by operating the damage input screen 200 in various manners using the input device (mouse 103, for instance).

Figure 6:
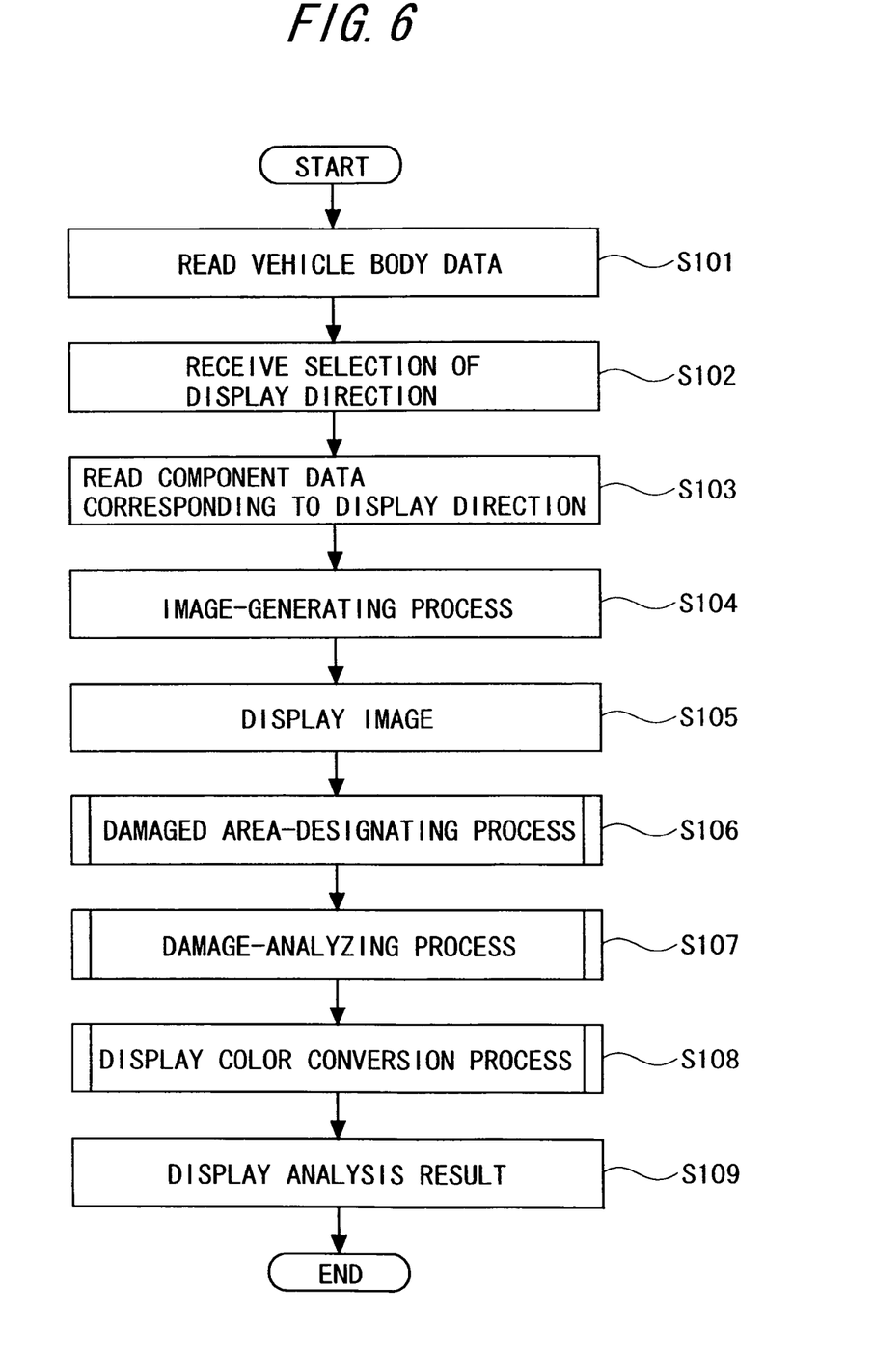
[FIG. 6] A flowchart showing an outline of a damage-analyzing program according to the embodiment.
Figure 7:
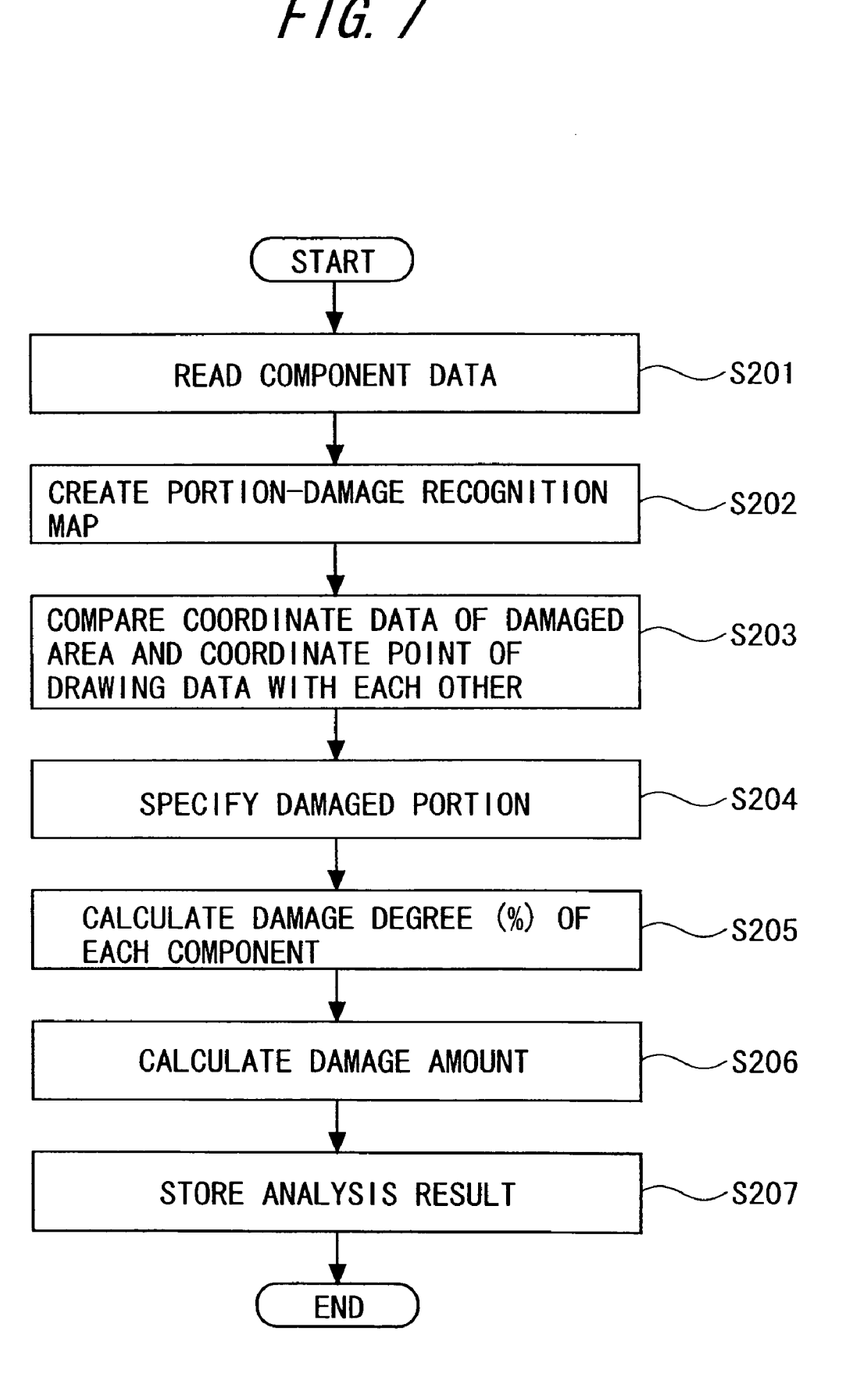
[FIG. 7] A flowchart showing an outline of a damage-analyzing process according to the embodiment.

Further, FIGS. 6 and 7 are each a flowchart showing a flow of a series of control exerted under the execution of the damage-analyzing program S.

After start of the damage-analyzing program S, first, the CPU 101 receives a selection of a car type by the user and reads vehicle body data F1 corresponding to the selected car type from the file region F (S101). It should be noted that as shown in FIG. 3, the vehicle body data F1 read from the file region F is read into an image-generating portion 301 of an internal process region constructed by the RAM 102, the CPU 101, and the like and is used in various processes in the image-generating portion 301.

Following this, the CPU 101 displays the damage input screen 200 shown in FIG. 4 on the display 106 and receives a selection of a vehicle body display direction by the user (S102). It should be noted that at the center of the damage input screen 200, a default image C read from the vehicle body data F1 is displayed. Also, on the left of the image C, icons 201 for selection of the vehicle body display direction are displayed for respective display directions. When one of the icons 201 is selected by the user through an operation, the display direction of the vehicle body that should be displayed at the center of the screen is determined.

Following this, the CPU 101 refers to the component data acquisition information incorporated into the vehicle body data F1 and reads the component data F2 that belongs to the designated display direction into the image-generating portion 301 (S103). Also, the CPU 101 carries out an image-generating process in which the drawing data I given to the component data F2 is individually assigned to the layers R and an image C of the vehicle body corresponding to the display direction is generated by superposing the layers R (S104). Then, the CPU 101 displays the image created through the image-generating process on the damage input screen 200 (S105). Also, the CPU 101 sets the whole of the motor vehicle displayed in the image C as an analysis target site and proceeds to a subsequent damaged area-designating process (S106).

In the damaged area-designating process, on the image C of the vehicle body displayed on the damage input screen 200, the CPU 101 receives input designating a damaged area by the user to the image C.

It should be noted that in response to start of the damaged area-designating process, the CPU 101 displays templates 202, such as a rectangular template, a round template, a triangular template, and a linear template, in a left area of the damage input screen 200 (see FIG. 5). Also, the CPU 101 receives a user's operation, in which one of the templates is selected and is attached to the image C, and detects an attachment site of the template as the damaged area.

Also, a damaged area input field 203 for input of a damaged area is provided below the templates 202 and the template 202a on the image C is enlarged/reduced in accordance with the damaged area inputted into the damaged area input field 203.

It should be noted that it is possible to change the designation of the damage area also through a template 202a enlargement/reduction operation based on drag and drop with the mouse 103.

Also, in the damaged area-designating process, in addition to the designation of the damaged area, designation of a damage state for reflecting a state of the damaged area in subsequent damage analysis is made. Therefore, a selection field 204 (GUI) for the designation of the damage state is displayed on the image C. Further, the damage state of the damaged area is detected with reference to a result of selection/designation from among alternatives, such as "dent", "unevenness", and "scuff", which are displayed in the selection field 204.

Still further, an operation confirmation field 205 for confirmation of whether the damaged area and damage state designated in the manner described above are to be reflected in the damage-analyzing process is provided in a lower right area of the damage input screen 200 and when an "OK" icon 205a provided in the operation confirmation field 205 is operated, items inputted by the user are confirmed and the CPU 101 proceeds to the subsequent damage-analyzing process (S107). Also, the confirmed damaged area is temporarily stored in a damage data-managing portion 302 of the internal process region under a state in which it is associated with coordinates assigned in units of display pixels of the image C.

On the other hand, when a "cancel" icon 205b displayed in the operation confirmation field 205 is operated, the template 202a on the image C becomes active and its position and size become changeable. In addition, it is also possible to cancel (delete) the attachment of the template 202a by operating the keyboard 107.

Next, the damage-analyzing process (S107) will be described with reference to the flowchart in FIG. 7.

In response to start of the damage-analyzing process, first, the CPU 101 reads the component data F2 used in the generation of the image into a damage-analyzing portion 303 of the internal process region (S201). Also, the CPU 101 creates a portion-damage recognition map for each layer with reference to the component data F2 (S202).

The portion-damage recognition map is equal to the layer R in display size and the drawing data I is shown on the map with a layout on the layer R. Also, the position of the drawing data I with respect to the portion-damage recognition map is specified with coordinates of the portion-damage recognition map assigned in units of display images of the layer R.

Following this, the CPU 101 reads coordinate data of the damaged area from the damage data-managing portion 302 and compares the coordinate data of the damaged area and coordinate points of the drawing data with each other on the portion-damage recognition map (S203). Then, the CPU 101 detects the presence or absence of damage at each coordinate point based on agreement or disagreement of the coordinate data of the damaged area and coordinate points of the drawing data (S204). That is, the CPU 101 calculates the coordinate points of the damaged area with reference to coordinates of the image C, compares the calculated coordinate points and the coordinate points of the drawing data I given to the layer with each other, and specifies each portion, in which the coordinate points agree with each other, as a damaged portion.

It should be noted that the size of the portion-damage recognition map is equal to the size of the layer R constituting the image C as described above and consistency between the coordinate points of the drawing data I grasped in the coordinate system of the portion-damage recognition map and the coordinates of the damaged area designated on the image C is secured. Therefore, even when the image is enlargement or reduction-displayed in the designation of the damaged area, for instance, the consistency between the coordinate points is secured and precise comparison of them is possible.

Following this, the CPU 101 calculates a damage degree of each component for each layer R (S205).

The damage degree is obtained with an expression given below. More specifically, the damage degree (%) of the component corresponding to each layer R is calculated from a ratio between the number of pixels given to the drawing data I and the number of pixels of the damaged portion specified in step 204 described above.

(Equation 1)

(the number of pixels specified as the damaged portion/the number of pixels of the drawing data)× 100=damage degree (%)    Expression 1

Following this, the CPU 101 calculates a damage amount of each component based on the calculated damage degree (S206).

More specifically, the CPU 101 calculates the damage amount of each component by setting the damage degree of the component and a damage coefficient K showing a damage state of the component as parameters and regards the whole of the component as a damaged portion on condition that the calculated damage amount exceeds a damage amount (12%, for instance) at which component replacement should be made. It should be noted that the damage amount, at which component replacement should be made, is a value that can be set/changed as appropriate based on empirical rules of persons skilled in the art or the like. Also, an expression given below is an example of an expression used to calculate the damage amount.

(Equation 2)

damage degree×K=damage amount (K: damage coefficient)    Expression 2

It should be noted that the damage coefficient K is set for each item in the selection field 204 displayed on the damage input screen 200 and is set higher as difficulty of damage repair increases. That is, by reflecting an actual damage state in the damage degree obtained from control numeric values such as pixels and coordinates, it becomes possible to calculate the damage amount appropriate to the actual damage. It should be noted that the damage coefficient K is a value that can be set/changed as appropriate based on empirical rules of persons skilled in the art or the like. Then, analysis results, such as the damaged area, the damaged portion, the damage degree, and the damage amount, of each component are stored in the damage data-managing portion 302 of the internal process region in the damage-analyzing process (S207) and the damage-analyzing process is exited.

Following this, the CPU 101 carries out a damaged portion display color conversion process (S108).

In the display color conversion process, the damaged portion of each component is read from the damage data-managing portion 302 and color information of the drawing data I positioned at the damaged site is changed. It should be noted that in the damage amount calculation described above, when the whole of the component is damaged, the component is recognized as a damaged portion in its entirety. Therefore, even when the component is dotted with multiple damaged portions, color information is changed in the entire region of the drawing data corresponding to the component as a result of execution of this process. On the other hand, in the case of local damage, only color information positioned at coordinate points of the damage is changed.

Then, the image C is reorganized in the layer R containing the drawing data I having undergone the display color conversion process and the reorganized image C is displayed on the display 106 as a damage analysis result (S109). That is, on the display 106, the damage analysis result is displayed in a visually recognizable display form in which color is changed.

In the manner described above, under the execution of the damage-analyzing program S, the individual drawing data $I_1$ to $I_n$ corresponding to the components constituting the motor vehicle is imported into the layers $R_1$ to $R_n$ and the image C of the analysis target site (whole of the vehicle body seen from a particular display direction) is generated by superposing the layers $R_1$ to $R_n$. Also, the input designating the damaged area by the user to the image C is received (S106). Then, the presence or absence of damage on each component is analyzed on a layer R-by-layer R basis, with each layer R having the drawing data I that belongs to the damaged area designated by the user (S107).

That is, the designation of the damaged area is received by means of the image C composed of the multiple layers R having the drawing data I corresponding to the components, so the designation of the damaged area is reflected in every layer R contained in the damaged region. As a result, component damage analysis on a layer R-by-layer R basis becomes possible and, as to the presence/absence of damage, it becomes possible for the user to reflect designation of the damaged area for each component by one operation without separately designating the damaged area for each component.

Also, in the damage analysis, the coordinate points of the damaged area is calculated with reference to the coordinates of the image C, the calculated coordinate points and the coordinate points of the drawing data I given to the layer R are compared with each other, and the damaged portion is specified in each layer based on agreement or disagreement of the calculated coordinate points and the coordinate points of the drawing data I given to the layer R.

That is, the coordinate points of the damaged area are calculated with reference to the coordinates of the image C having consistency with the coordinate system of the layer R, so precise comparison of the calculated coordinate points and the coordinate points of the drawing data I given to the layer R is possible without using any complicated computation process. Also, in the damage-analyzing process, on condition that the calculated damage degree exceeds the damage degree at which the component should be replaced, the whole of the component is specified as a damaged portion. As a result, in addition to local damage analysis, damage analysis, whose target is the whole of the component, also becomes possible.

Further, in the designation of the damaged area, in response to the operation in which the user selects the template 202a and attaches it to the image C, the attachment position of the template 202a is recognized as the damaged area. Therefore, it becomes possible for the user to designate the damaged area through simple work in which the user merely selects and attaches the template 202a.

It should be noted that the embodiment described above is merely a preferred embodiment and it is possible to change the details thereof in various manners.

For instance, in the embodiment described above, the input designating the damaged area is made using the templates 202 but the present invention is not limited to this. For instance, area designation using a pointing device, such as the mouse 103, is also possible. In this case, for instance, area designation using a general region-designating operation, which is used in an operation of the operating system W and in which, for instance, a left mouse button is pressed down, the mouse is dragged, and then the left mouse button is released, is made.

Also, in the embodiment described above, the analysis result is displayed by changing the color of the damaged portion but a construction is also conceivable in which, for instance, the damaged portion is displayed conspicuously with respect to other sites by setting the other sites transparent through RGB-based color tone conversion while maintaining the color of the damaged portion.

Further, in the embodiment described above, the input designating the damaged area is made to the image of the whole of the vehicle body displayed on the damage input screen 200. However, for instance, a part of the vehicle body may be enlargement-displayed and the input designating the damaged area may be received on the enlarged image C. It should be noted that the coordinates of the portion-damage recognition map used in the damage analysis are equal to the coordinates of the layers constituting the image C as described above, so even when the display magnification of the image C is changed, the consistency between the portion-damage recognition map and the image C is secured. Therefore, even when the function described above is added, it is possible to accurately analyze the damage without performing any complicated computation.

Still further, a construction is also usable in which a damage-estimating program is added to the damage-analyzing program S and a cost of repair of the damage is calculated based on the damage amount calculated with the damage-analyzing program S. It should be noted that in this case, a construction is also conceivable in which, for instance, data as to component prices, replacement work wages, repair costs, and the like are given to the component data F2, necessity for replacement and possibility of repair are judged for each component based on the damage amount (analysis result) calculated with the damage-analyzing program S, and the repair cost is calculated with reference to a result of the judgment and the component data F2.

The invention claimed is:

1. A damage analysis-supporting system for supporting analysis of damage on a motor vehicle, characterized by comprising:
    an image-generating apparatus that imports individual drawing data corresponding to components constituting the motor vehicle into layers and generates an image of an analysis target site by superposing the layers;
    an area designation-receiving apparatus that receives input designating a damaged area by a user to the image; and
    a damage-analyzing apparatus that specifies a damaged portion of each component on a layer-by-layer basis, with each layer having drawing data that belongs to the damaged area designated by the user.

2. A damage analysis-supporting system according to claim 1, characterized in that the damage-analyzing apparatus calculates coordinate points of the damaged area with reference to coordinates of the image, and compares the calculated coordinate points and coordinate points of the drawing data given to the layers with each other to specify each portion, in which the coordinate points agree with each other, as the damaged portion.

3. A damage analysis-supporting system according to claim 1, characterized in that the damage-analyzing apparatus comprises a damage degree-calculating apparatus that, based on ratios of a number of pixels of the damaged portion to numbers of pixels of the drawing data, calculates damage degrees of the components corresponding to the drawing data.

4. A damage analysis-supporting system according to claim 3, characterized in that on condition that any of the damage degrees calculated by the damage degree-calculating apparatus exceed a damage degree at which component replacement should be made, the damage-analyzing apparatus specifies a whole of each corresponding component as the damaged portion.

5. A damage analysis-supporting system according to claim 1, characterized in that:
    a plurality of templates are prepared which are used to designate the damaged area; and
    in response to an operation in which the user selects one of the templates and attaches the selected template to the image, the area designation-receiving apparatus detects an attachment position of the template as the damaged area.

6. A damage analysis program embodied on a computer-readable medium for causing a computer to support analysis of damage on a motor vehicle, characterized in that the computer caused to realize:
    an image-generating function of importing individual drawing data corresponding to components constituting the motor vehicle into layers and generating an image of an analysis target site by superposing the layers;
    an area designation-receiving function of receiving input designating a damaged area by a user to the image; and
    a damage-analyzing function of specifying a damaged portion of each component on a layer-by-layer basis, with each layer having drawing data that belongs to the damaged area designated by the user.

7. A damage analysis program according to claim 6, characterized in that the damage-analyzing function comprises: a function of calculating coordinate points of the damaged area with reference to coordinates of the image; and a function of comparing the calculated coordinate points and coordinate points of the drawing data given to the layers with each other to specify each portion, in which the coordinate points agree with each other, as the damaged portion.

8. A damage analysis-supporting method for causing a computer to support analysis of damage on a motor vehicle, characterized in that the computer imports individual drawing data corresponding to components constituting the motor vehicle into layers, generates an image of an analysis target site by superposing the layers, receives input designating a damaged area by a user to the image, and specifies a damaged portion of each component on a layer-by-layer basis, with each layer having drawing data that belongs to the damaged area designated by the user.

9. A damage analysis-supporting method according to claim 8, characterized in that at the time of the specification of the damaged portion, coordinate points of the damaged area are calculated with reference to coordinates of the image, and the calculated coordinate points are compared with coordinate points of the drawing data given to the layers to specify each portion, in which the coordinate points agree with each other, as the damaged portion.

* * * * *